(12) United States Patent
Lee (10) Patent No.: US 9,179,094 B2
(45) Date of Patent: Nov. 3, 2015

(54) PHOTOGRAPHING APPARATUS AND METHOD OF CONTROLLING THE SAME

(71) Applicant: SAMSUNG ELECTRONICS CO., LTD., Suwon-si, Gyeonggi-do (KR)

(72) Inventor: Young-sin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 14/176,329

(22) Filed: Feb. 10, 2014

(65) Prior Publication Data

US 2015/0054908 A1   Feb. 26, 2015

(30) Foreign Application Priority Data

Aug. 23, 2013 (KR) .................. 10-2013-0100572

(51) Int. Cl.
*H04N 7/14* (2006.01)
*G10L 21/00* (2013.01)
(Continued)

(52) U.S. Cl.
CPC ............... *H04N 7/141* (2013.01); *G03B 17/04* (2013.01); *H04N 7/14* (2013.01); *G03B 29/00* (2013.01); *G03B 2205/0092* (2013.01); *H04M 1/0264* (2013.01)

(58) Field of Classification Search
CPC ........... G03B 17/04; G03B 2205/0092; G03B 29/00; G01S 5/0072; H04M 1/0264; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04W 4/18; H04W 4/185

USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566
See application file for complete search history.

(56) References Cited

U.S. PATENT DOCUMENTS 7,415,416 B2 *  8/2008  Rees ............................. 704/275
8,514,273 B2 *  8/2013  Mori ............................. 348/51
(Continued)

FOREIGN PATENT DOCUMENTS

JP   2001-133867 A   5/2001
JP   2004-165705 A   6/2004
(Continued)

OTHER PUBLICATIONS

Extended European Search Report issued for EP14181487.1 (Mar. 31, 2015).

*Primary Examiner* — Khai N Nguyen
(74) *Attorney, Agent, or Firm* — Drinker Biddle & Reath LLP (57) ABSTRACT

A method of controlling a photographing apparatus having a voice call function is described. A determination of whether the voice call function is being performed is made upon an input of a shutter release signal of the photographing apparatus. A distance between the photographing apparatus and an object is sensed when the voice call function is being performed upon the input of the shutter release signal. A barrel driving mode is disabled based on the shutter release signal when the sensed distance is equal to or less than a predetermined value.

20 Claims, 7 Drawing Sheets

(51) Int. Cl.
    *G10L 25/00*     (2013.01)
    *G03B 17/04*     (2006.01)
    *G03B 29/00*     (2006.01)
    *H04M 1/02*     (2006.01)

(56) References Cited

U.S. PATENT DOCUMENTS

| | | | | |
|---|---|---|---|---|
| 2004/0080655 | A1* | 4/2004 | Watanabe et al. | 348/335 |
| 2005/0102133 | A1* | 5/2005 | Rees | 704/205 |
| 2008/0291297 | A1* | 11/2008 | Watanabe et al. | 348/240.3 |
| 2011/0013000 | A1* | 1/2011 | Mori | 348/51 |
| 2012/0113279 | A1 | 5/2012 | Park et al. | |
| 2012/0113280 | A1* | 5/2012 | Stupak et al. | 348/208.99 |
| 2012/0235089 | A1* | 9/2012 | Nakayama et al. | 252/299.5 |
| 2013/0095886 | A1 | 4/2013 | Hong et al. | |
| 2013/0100538 | A1* | 4/2013 | Kim | 359/683 |

FOREIGN PATENT DOCUMENTS

| | | |
|---|---|---|
| KR | 1020120047598 A | 5/2012 |
| WO | WO 2008/003349 A1 | 1/2008 |

* cited by examiner

PHOTOGRAPHING APPARATUS AND METHOD OF CONTROLLING THE SAME

CROSS-REFERENCE TO RELATED APPLICATIONS

This application claims the priority benefit under 35 U.S.C. §119(a) from Korean Patent Application No. 10-2013-0100572, filed on Aug. 23, 2013, in the Korean Intellectual Property Office, the disclosure of which is incorporated by reference herein in its entirety.

BACKGROUND

1. Field

One or more embodiments relate to photographing apparatuses and methods of controlling the same.

2. Related Art

Generally, in a camera, depending on an operation state of a power switch or an operation state of a shutter release button, a barrel automatically shifts to an open position, such as a position at which the barrel is protruded to an outside of the camera to enable a photographing mode, or a close position, such as a position at which the barrel is retracted into the camera to disable the photographing mode. At the open position, a zoom operation is performed to shift the barrel to a predetermined focal position according to an operation of a zoom switch.

The barrel shifts according to the rotation of a motor, such as a zoom motor. In detail, when the zoom motor rotates, gear groups connected to the zoom motor rotate and a rotation force of the zoom motor is transmitted through the gear groups to a barrel member of the barrel. Accordingly, the barrel member rotates and the barrel shifts forward or backward.

However, in a case where a user carries various smart devices in the user's pocket, when the shutter release button is pressed, the barrel protrudes inside the user's pocket, or when the user unintentionally presses the shutter release button, the barrel abruptly protrudes. These situations are situations in which the barrel abruptly protrudes when the user does not want to photograph.

SUMMARY

One or more embodiments include photographing apparatuses and methods of controlling the same, which may prevent a camera barrel from protruding in an undesired situation of a user and drive the camera barrel according to a user's intention.

Additional aspects will be set forth in part in the description which follows and, in part, will be apparent from the description, or may be learned by practice of the presented embodiments.

According to one or more embodiments, a method of controlling a photographing apparatus having a voice call function includes: determining whether the voice call function is being performed upon to an input of a shutter release signal of the photographing apparatus; sensing a distance between the photographing apparatus and an object when the voice call function is being performed upon the input of the shutter release signal; and disabling a barrel driving mode based on the shutter release signal when the sensed distance is equal to or less than a predetermined value.

The method may further include determining posture information of the photographing apparatus. The barrel driving mode may be controlled based on the determined posture information.

The determined posture information may include information for determining whether the voice call function of the photographing apparatus or a photographing function of the photographing apparatus is being performed.

The disabling of the barrel driving mode may be maintained when the determined posture information is information indicating that the voice call function is being performed.

The disabling of the barrel driving mode may be released when the determined posture information is information indicating that the photographing function is being performed.

The method may further include recognizing a voice of a user of the photographing apparatus. The barrel driving mode may be controlled based on recognized voice information for the voice of the user.

The recognized voice information may include information for performing a photographing function of the photographing apparatus.

The disabling of the barrel driving mode may be released when the recognized voice information is the information for performing the photographing function.

The voice call function may be determined as being performed when a hands-free connection signal is received.

The method may further include setting a barrel protection mode.

According to one or more embodiments, a photographing apparatus having a voice call function includes: a voice call detecting unit that determines whether the voice call function is being performed upon an input of a shutter release signal of the photographing apparatus; a distance determining unit that senses a distance between the photographing apparatus and an object when the voice call function is being performed upon the shutter release signal; and a barrel driving control unit that disables a barrel driving mode based on the shutter release signal when the sensed distance is equal to or less than a predetermined value.

The apparatus may further include a posture determining unit that determines posture information of the photographing apparatus. The barrel driving control unit may control the barrel driving mode based on the determined posture information.

The determined posture information may include information for determining whether the voice call function of the photographing apparatus or a photographing function of the photographing apparatus is being performed.

The posture determining unit may receive posture information of the photographing apparatus from at least one of a gyro sensor, an acceleration sensor, a tilt sensor, or a rotation sensor that are provided in the photographing apparatus.

The apparatus may further include a voice recognizing unit that recognizes a voice of a user of the photographing apparatus. The barrel driving control unit may control the barrel driving mode based on recognized voice information for the voice of the user.

The recognized voice information may include information for performing a photographing function of the photographing apparatus.

The barrel driving control unit may release the disabling of the barrel driving mode when the recognized voice information is the information for performing the photographing function.

The distance determining unit may receive distance information through a proximity sensor provided in the photographing apparatus.

The apparatus may further include a control unit that sets a barrel protection mode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The invention may include various embodiments and modifications, and embodiments are illustrated in the drawings and will be described below in detail. However, it will be understood that the invention is not limited to the described embodiments and includes all modifications, equivalents, and substitutions falling within the spirit and scope of the invention. In the following description, detailed descriptions of well-known functions or configurations will be omitted where they may unnecessarily obscure the subject matters of the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Hereinafter, embodiments will be described in detail with reference to the accompanying drawings. In the following description, like reference numerals denote like elements, and a redundant description thereof will be omitted.

Figure 1:
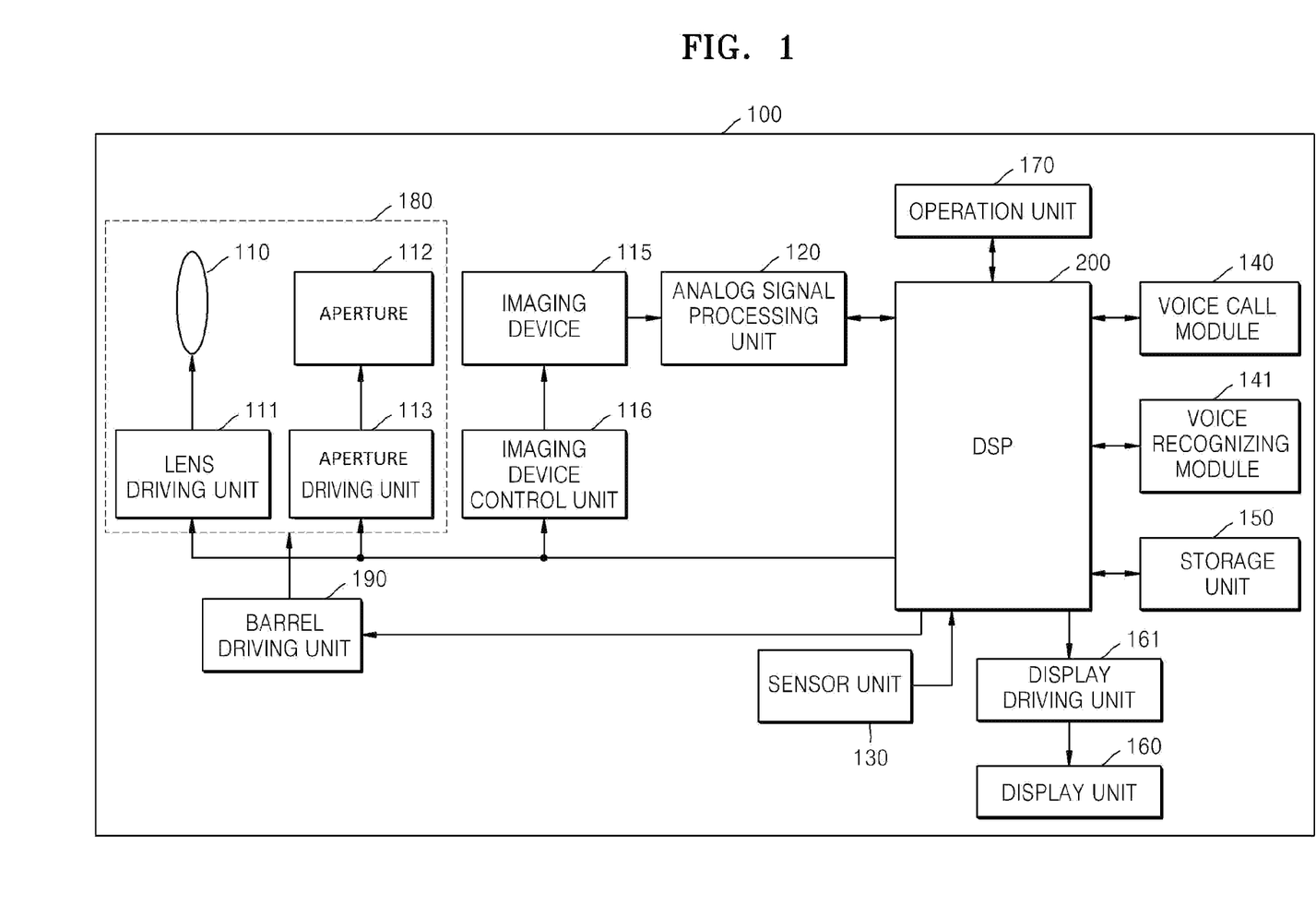
FIG. 1 is a block diagram illustrating a schematic configuration of a digital camera as an example of a photographing apparatus according to an embodiment.

FIG. 1 is a block diagram illustrating a schematic configuration of a digital camera 100 as an example of a photographing apparatus according to an embodiment.

The digital camera 100 will be described as an example of a photographing apparatus according to an embodiment. However, the photographing apparatus is not limited to the digital camera 100 illustrated in FIG. 1, and may also be digital apparatuses such as camera phones, personal digital assistants (PDAs), and portable multimedia players (PMPs).

According to an embodiment, the digital camera 100 may include a lens unit 110, a lens driving unit 111, an aperture 112, an aperture driving unit 113, an imaging device 115, an imaging device control unit 116, an analog signal processing unit 120, a sensor unit 130, a voice call module 140, a voice recognizing module 141, a storage unit 150, a display unit 160, a display driving unit 161, a digital signal processing unit (DSP) 200, and an operation unit 170. Herein, the lens unit 110, the lens driving unit 111, the aperture 112, the aperture driving unit 113, the imaging device 115, the imaging device control unit 116, and the analog signal processing unit 120 may be collectively referred to as an imaging unit.

The lens unit 110 focuses an optical signal (e.g., incident light). The lens unit 110 may include a zoom lens for increasing or decreasing a viewing angle based on a focal length, and a focus lens for focusing a subject. Each of the zoom lens and the focus lens may include one lens or may include a group of lenses. The aperture 112 controls the quantity of incident light by controlling its degree of opening. The lens driving unit 111 drives the lens unit 110 based on a control signal from the DSP 200, and the aperture driving unit 113 drives the aperture 112 based on a control signal from the DSP 200. The lens driving unit 111 controls a position of a lens to control a focal length thereof, and may further perform one or more of an auto-focusing (AF) operation, a zoom change operation, or a focus change operation. The aperture driving unit 113 controls the degree of opening of the aperture 112. In particular, the aperture driving unit 113 controls an f-number or an aperture value to perform one or more of an AF operation, an automatic exposure correction operation, a focus change operation, or a subject depth control operation.

The lens unit 110, the lens driving unit 111, the aperture 112, and the aperture driving unit 113 may be included in a barrel 180. The barrel 180 may be inserted into, or protrude from, a main body of the digital camera 100 based on a driving control signal of a barrel driving unit 190. The barrel driving unit 190 drives the barrel 180 based on a control signal from the DSP 200. The barrel driving unit 190 may include a step motor, a voice coil motor, or a piezo motor, and a driving mechanism thereof may include a rack-pinion system, a rotary screw structure, a linear sliding structure, or a cam structure. Technology for shifting the barrel 180 is well known in the art, and thus a detailed description thereof will be omitted. As illustrated in FIG. 2B and FIG. 2C, when a shutter release button 101 of the digital camera 100 is pressed, the barrel 180 is protruded forward. If the shutter release button 101 is not pressed, the barrel 180 remains retracted and inserted into the main body. Also, when the digital camera 100 changes from a power-on state to a power-off state, the barrel 180 maintains a state of being inserted into the main body, as illustrated in FIG. 2B.

An optical signal (e.g., incident light), which has passed through the lens unit 110, forms an image of the subject at a light-receiving surface of the imaging device 115. The imaging device 115 may include a charge-coupled device (CCD), a complementary metal-oxide-semiconductor image sensor (CIS), or a high-speed image sensor that converts the optical signal into an electrical signal. The sensitivity of the imaging device 115 may be controlled by the imaging device control unit 116. The imaging device control unit 116 may control the imaging device 115 based on a control signal that is automatically generated based on an image signal that is input in real time, or based on a control signal that is manually input by a user's operation. An exposure time of the imaging device 115 is controlled by a shutter (not illustrated). Examples of the shutter include a mechanical shutter that controls the incidence of light by shifting a shield, or an electronic shutter that controls exposure by supplying an electrical signal to the imaging device 115. The analog signal processing unit 120 performs one or more of a noise reduction operation, a gain control operation, a waveform shaping operation, or an analog-to-digital conversion operation on an analog signal (e.g., the converted electrical signal) supplied from the imaging device 115.

The sensor unit 130 senses information about a distance of the digital camera 100 to an object, for example, a user holding the digital camera 100, or posture information including a tilt degree and rotation information of the digital camera 100. For example, the sensor unit 130 may include one or more sensors, such as a proximity sensor 104 (illustrated in FIG. 2A), a gyro sensor, an acceleration sensor, a tilt sensor, or a rotation sensor. When the digital camera 100 having a voice call function is performing a voice call, the sensor unit 130 may use the proximity sensor 104 or other sensors to determine the distance to the user or other object, thereby determining whether a protrusion distance of the barrel 180 is available. Also, the sensor unit 130 may use a gyro sensor, an acceleration sensor, a tilt sensor, or rotation sensor to determine a current function state of the digital camera 100, for example, to determine whether the digital camera 100 is performing a voice call function or a photographing function. A detailed function of the sensing unit 130 will be described below with reference to FIG. 2 and FIG. 6.

Figure 2A:
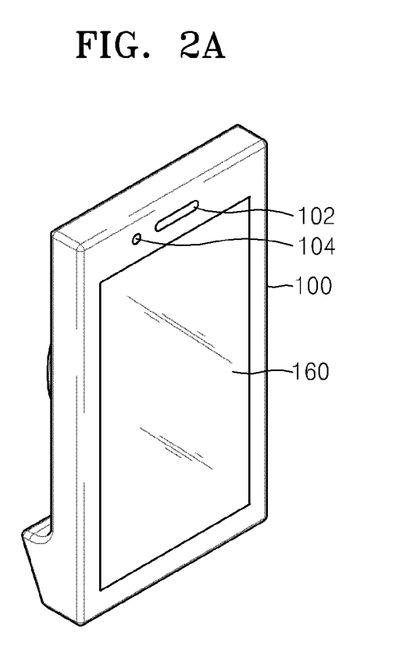
FIG. 2A, FIG. 2B, and FIG. 2C are perspective diagrams illustrating a state of shifting a barrel of the photographing apparatus illustrated in FIG. 1.
Figure 2B:
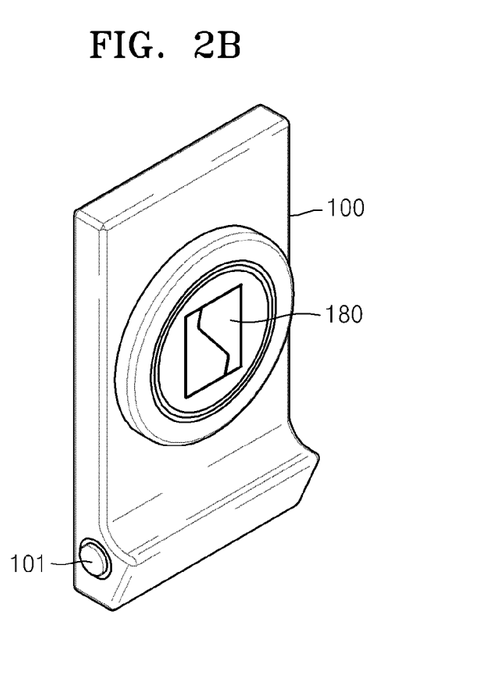
Figure 2C:
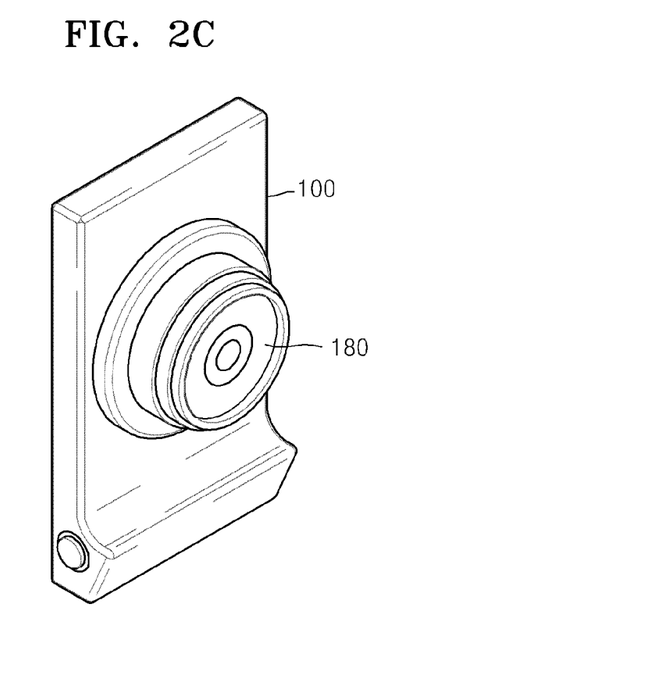

Referring to FIG. 2A, a rear perspective view of the digital camera 100 is illustrated. In FIG. 2A, a speaker 102 for a voice call function and the proximity sensor 104 that is adjacent to the speaker 102 are illustrated. When the user uses the digital camera 100 to perform the voice call function (e.g., in a voice call mode), the user brings the speaker 102 toward his ear and the proximity sensor 104 senses a distance to the user. When in the voice call mode and the predetermined distance is not available, the barrel 180 is not protruded as illustrated in FIG. 2B even when the shutter release button 101 is pressed. On the other hand, when in the voice call mode and the predetermined distance is available, the barrel 180 is protruded as illustrated in FIG. 2C.

Figure 6A:
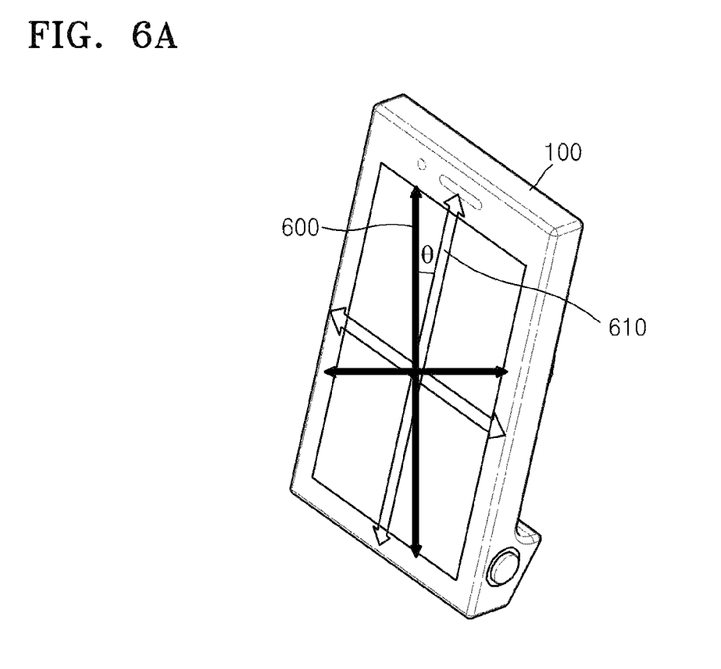
FIG. 6A and FIG. 6B are perspective diagrams illustrating an example of posture information of the photographing apparatus illustrated in FIG. 1, according to an embodiment.
Figure 6B:
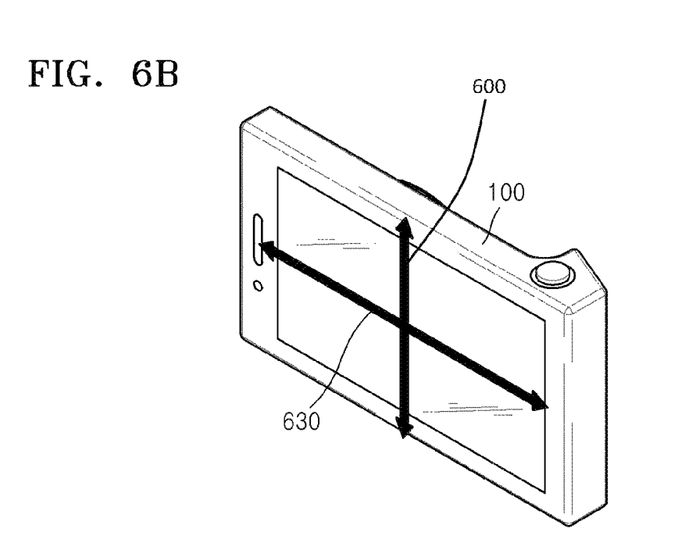

Referring to FIG. 6A, posture information 610 of the digital camera 100, such as an angle θ, is sensed through the tilt sensor of the sensor unit 130. As illustrated in FIG. 6A, when the digital camera 100 is tilted at an angle of approximately 10° to approximately 20° with respect to a vertical line 600, it may be determined that the digital camera 100 is performing a voice call function. Referring to FIG. 6B, when a tilt of the digital camera 100 is approximately horizontal (e.g., approximately along line 630) or vertical (e.g., approximately along line 600), it may be determined that the digital camera 100 performs a photographing function, even when the digital camera 100 performs a voice call function.

The voice call module 140 performs a voice call function of the digital camera 100. Based on an operation state of the voice call module 140, the DSP 200 determines whether the user is performing a voice call function, and controls the barrel driving unit 190 to protrude or retract the barrel 180. Even when the digital camera 100 is performing a voice call function, the DSP 200 determines whether the barrel 180 may be protruded, based on distance information and posture information received from the sensor unit 130. This will be described below in detail with reference to FIGS. 3 to 5.

The operation unit 170 may be used to input a control signal from outside the digital camera 100, such as from the user. The operation unit 170 may include the shutter release button 101 for inputting a shutter release signal for photographing by exposing the imaging device 115 to light for a predetermined time, a power button (not shown) for inputting a control signal for controlling a power on/off, a wide-angle zoom button and a telephoto zoom button for increasing or decreasing a viewing angle based on an input, or various function buttons, such as a mode selection button for selecting a mode such as a character input mode, a photographing mode, or a display mode, a white balance setting button, and an exposure setting button. The operation unit 170 may have various buttons as described above, but is not limited thereto. The operation unit 170 may be implemented with one or more user input units, such as a keyboard, a touch pad, a touchscreen, or a remote controller. The user may use the shutter release button 101 (see FIGS. 2A to 2C) of the operation unit 170 or the power button to drive the barrel 180.

The digital camera 100 includes one or more of a program storage unit (not illustrated) for storing programs for an application system or an operating system for operating the digital camera 100, a buffer storage unit (not illustrated) for temporarily storing data necessary for operation and result data, or the storage unit 150 for storing an image file including an image signal and various information necessary for the programs.

The digital camera 100 includes the display unit 160 for displaying an operation state of the digital camera 100 and image information captured by the digital camera 100. The display unit 160 may provide one or more of visual information or aural information to the user (e.g., via the speaker 102). In order to provide visual information, the display unit 160 may include, for example, a liquid crystal display (LCD) panel, or an organic light-emitting display (OLED) panel. The display driving unit 161 provides a driving signal to the display unit 160.

Also, the digital camera 100 includes the DSP 200 for processing an input image signal (e.g., image data) and controlling the respective component units (e.g., lens driving unit 111, aperture driving unit 113, image device control unit 116, barrel driving unit 190) based on one or more external input signals. The DSP 200 may reduce noise in input image data and may perform image signal processing operations for image quality improvement, such as gamma correction, color filter array interpolation, color matrix, color correction, or color enhancement. Also, the DSP 200 may generate an image file by compressing the image data generated by the image signal processing operations for image quality improvement, or may restore the image data from the image file. An image compression format may be a reversible format or an irreversible format. Examples of the image compression format may include a Joint Photographic Experts Group (JPEG) format and a JPEG 2000 format. The compressed data may be stored in the storage unit 150. Also, the DSP 200 may perform functions such as obscuring, coloring, blurring, edge emphasis, image interpretation, image recognition, or image effects. Examples of image recognition that may be performed by the DSP 200 include face recognition or scene recognition. In other examples, the DSP 200 may perform luminance level adjustment, color correction, contrast adjustment, outline emphasis adjustment, screen division, character image generation, or image synthesis.

Also, by executing a program stored in the program storage unit (not illustrated) or having a separate module, the DSP 200 may generate control signals for controlling auto focusing, zoom change, focus change, or automatic exposure correction, provide the control signals to the lens driving unit 111, the aperture driving unit 113, and the imaging device control unit 116, and control the overall operations of the components of the digital camera 100, such as a shutter and a flash unit. Also, the DSP 200 outputs a barrel driving control signal to the barrel driving unit 190 to control the insertion or protrusion of the barrel 180 by shifting the barrel 180 forward or backward.

Figure 3:
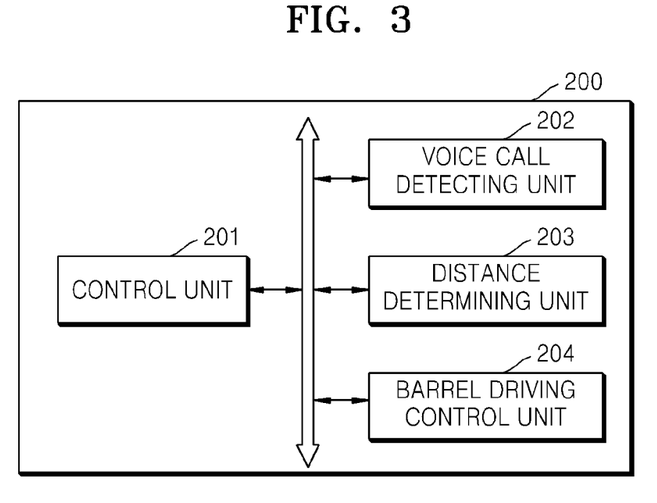
FIG. 3 is a block diagram illustrating an example of a digital signal processing unit (DSP) of the photographing apparatus illustrated in FIG. 1, according to an embodiment.

FIG. 3 is a block diagram illustrating an example of the DSP 200 illustrated in FIG. 1.

Referring to FIG. 3, the DSP 200 includes a control unit 201, a voice call detecting unit 202, a distance determining unit 203, and a barrel driving control unit 204. In some embodiments, the DSP 200 performs or controls one or more steps for a photographing apparatus.

The voice call detecting unit 202 determines whether a voice call function is being performed, depending on an enablement or disablement of the voice call module 140 illustrated in FIG. 1. When the control unit 201 receives a shutter release signal from the operation unit 170, the voice call detecting unit 202 determines whether a voice call function is being performed under the control of the control unit 201.

When the voice call detecting unit 202 determines that a voice call function is being performed, the distance determining unit 203 senses a distance to an object. By using the proximity sensor 104 illustrated in FIG. 2A, the distance determining unit 203 may determine how close the user is to the digital camera 100, and output determined distance information to the control unit 201.

The control unit 201 determines whether the sensed distance is equal to or less than a predetermined value. Herein, the predetermined value may be an optional value corresponding to a length of the barrel 180, but is not limited thereto. Even in a voice call mode, when a shutter release signal is input and the sensed distance is greater than the predetermined value (e.g., when a sufficient distance for protrusion of the barrel 180 is available), the control unit 201 protrudes the barrel 180. On the other hand, when the sensed distance is equal to or less than the predetermined value (e.g., when a sufficient distance for protrusion of the barrel 180 is not available), the control unit 201 determines that the shutter release signal is incorrectly input, and does not protrude the barrel 180 to protect the barrel 180. The control unit 201 outputs a control signal for enablement or disablement of a barrel driving mode to the barrel driving control unit 204.

Under the control of the control unit 201, the barrel driving control unit 204 may output a barrel protrusion signal for protruding the barrel 180 to the barrel driving unit 190, or disable the barrel driving mode.

Figure 4:
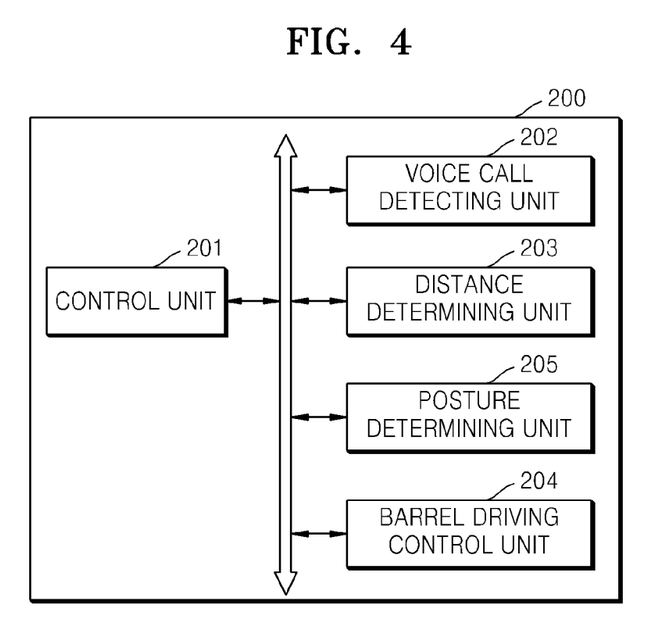
FIG. 4 is a block diagram illustrating another example of the DSP of the photographing apparatus illustrated in FIG. 1.

FIG. 4 is a block diagram illustrating another example of the DSP 200 illustrated in FIG. 1.

Referring to FIG. 4, the DSP 200 includes the control unit 201, the voice call detecting unit 202, the distance determining unit 203, the barrel driving control unit 204, and a posture determining unit 205. A description of the same configurations as in FIG. 3 will be omitted, and an additional configuration will be described.

The posture determining unit 205 receives posture information of the digital camera 100 from the sensor unit 130, and determines whether the digital camera 100 is performing a voice call function or a photographing function, based on the received posture information. As illustrated in FIGS. 6A and 6B, by determining a tilt or a rotation state of the digital camera 100, the posture determining unit 205 determines whether the digital camera 100 is performing a voice call function or a photographing function. For example, even when the voice call detecting unit 202 determines that the digital camera 100 is performing a voice call function, the barrel 180 is driven based on the shutter release signal when the digital camera 100 is in a posture for performing a photographing function, as illustrated in FIG. 6B. In this case, the user may intend for an image to be captured in a voice call mode and immediately transmitted to a called party, thus the barrel 180 is protruded based on an indication of the user's intention (e.g., the posture information).

Figure 5:
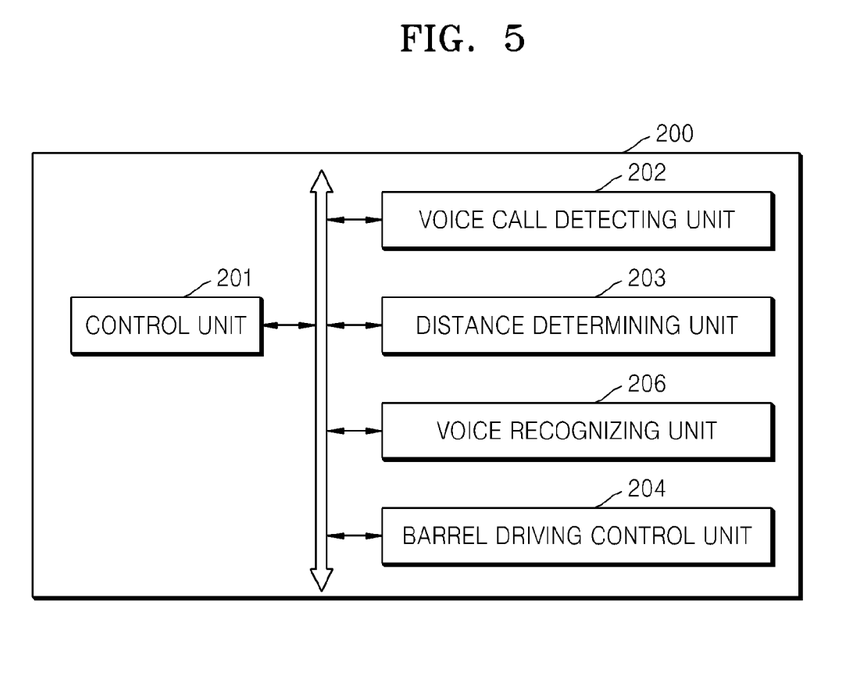
FIG. 5 is a block diagram illustrating yet another example of the DSP of the photographing apparatus illustrated in FIG. 1.

FIG. 5 is a block diagram illustrating another example of the DSP 200 illustrated in FIG. 1.

Referring to FIG. 5, the DSP 200 includes the control unit 201, the voice call detecting unit 202, the distance determining unit 203, the barrel driving control unit 204, and a voice recognizing unit 206. A description of the same configurations as in FIG. 3 will be omitted, and an additional configuration will be described.

When the voice call detecting unit 202 determines that a voice call function is being performed, the voice recognizing unit 206 detects a user's voice as an input, such as "wait a moment" or "hold on", for example. When the voice recognizing unit 206 recognizes a predetermined voice, the control unit 201 releases the disablement of the barrel driving mode (e.g., enables the barrel driving mode) and drives the barrel 180. In this case, the barrel 180 may be driven based on an indication of the user's intention (e.g., the user's voice) when the user performs a photographing function during a call to another user.

Also, although not illustrated, even when the user makes a hands-free call, when receiving a hands-free connection signal, the digital camera 100 may determine that the digital camera 100 is performing a voice call function, and control the barrel driving mode.

Figure 7:
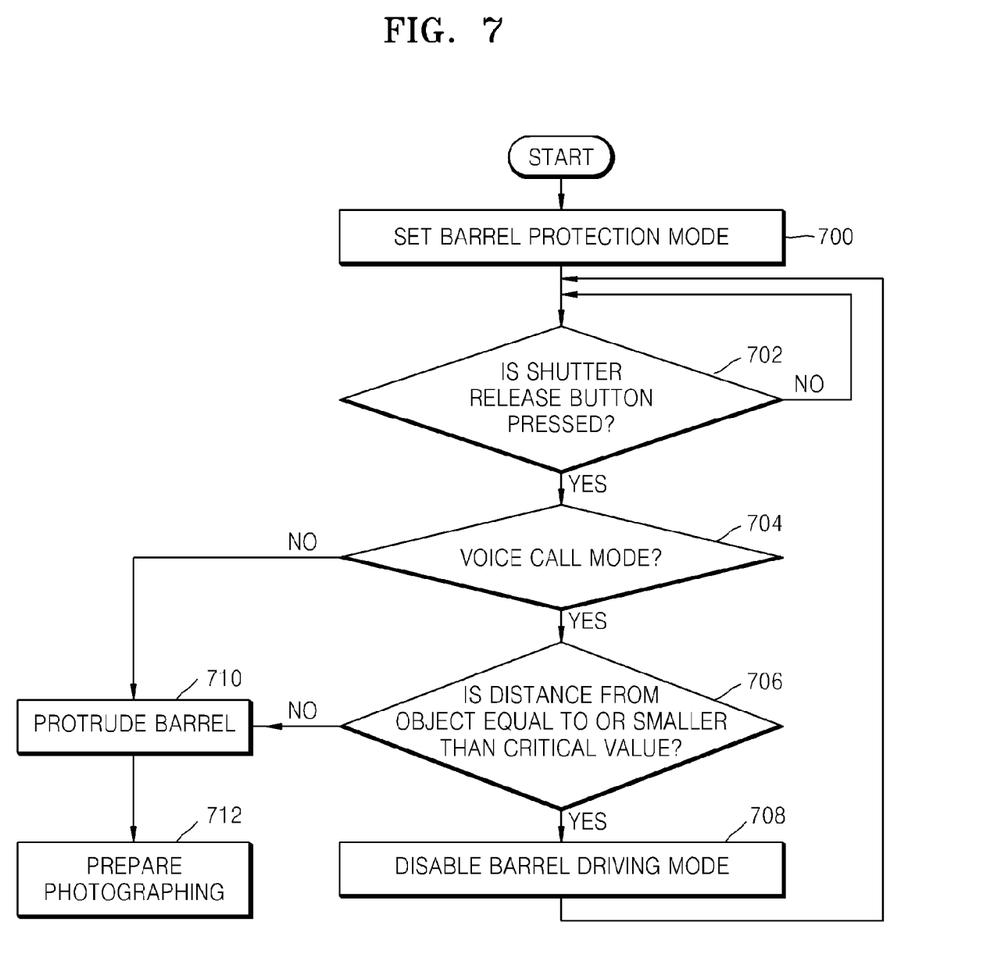
FIG. 7 is a flowchart illustrating one example of a method of controlling the photographing apparatus illustrated in FIG. 1, according to an embodiment.

FIG. 7 is a flowchart illustrating a method of controlling the photographing apparatus (e.g., the digital camera 100), according to an embodiment.

Referring to FIG. 7, in operation 700, a barrel protection mode is set (e.g., by the control unit 201). Herein, the barrel protection mode refers to a mode of driving or not driving the barrel 180 when detecting a predetermined condition, in comparison with a general mode of driving the barrel 180 based on a shutter release signal, when the user presses the shutter release button 101. Herein, the barrel protection mode may be omitted in some implementations.

In operation 702, the photographing apparatus determines whether the shutter release button 101 has been pressed. When the shutter release button 101 has been pressed (YES at 702), the photographing apparatus determines whether the photographing apparatus is performing a voice call function (e.g., in a voice call mode), in operation 704. When the photographing apparatus is performing a voice call function (YES at 704), the photographing apparatus determines whether a distance to an object is equal to or less than a predetermined value, in operation 706. A case where the distance to the object is equal to or less than the predetermined value may correspond to a situation in which the barrel 180 may be protruded and damaged, the user may be inconvenienced by abrupt protrusion of the barrel 180, or the camera may be dropped. When the distance to the object is equal to or less than the predetermined value in operation 706, the photographing apparatus disables the barrel driving mode in operation 708 and returns to operation 702. Herein, the predetermined value may be an optional value corresponding to the length of the barrel 180, but is not limited thereto.

Otherwise, when the photographing apparatus is not performing a voice call function in operation 704 (NO at 704), the photographing apparatus protrudes the barrel 180 in operation 710 and prepares photographing in operation 712. Also, when the distance to the object is not equal to or less than the predetermined value in operation 706 (NO at 706), that is, when a sufficient distance for protrusion of the barrel 180 is available, the photographing apparatus protrudes the barrel 180 in operation 710.

Figure 8:
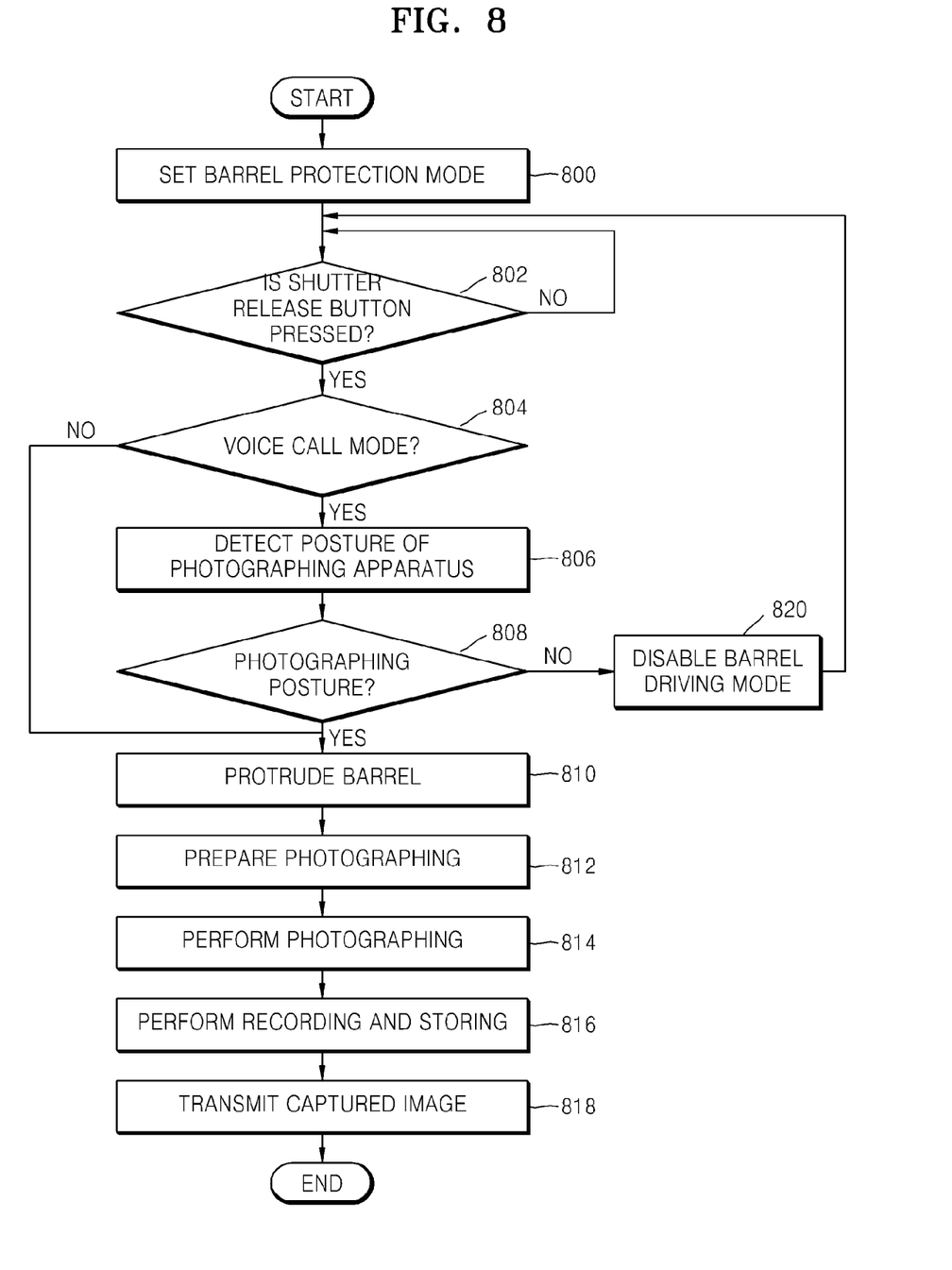
FIG. 8 is a flowchart illustrating one example of a method of controlling the photographing apparatus illustrated in FIG. 1, according to another embodiment.

FIG. 8 is a flowchart illustrating a method of controlling the photographing apparatus (e.g., the digital camera 100), according to another embodiment.

Referring to FIG. 8, in operation 800, a barrel protection mode is set (e.g., by the control unit 201). In operation 802, the photographing apparatus determines whether the shutter release button 101 has been pressed. When the shutter release button 101 has been pressed (YES at 802), the photographing apparatus determines whether the photographing apparatus is performing a voice call function (e.g., in a voice call mode), in operation 804. When the photographing apparatus is performing a voice call function (YES at 804), the photographing apparatus detects a posture of the photographing apparatus in operation 806. When the photographing apparatus is not at a photographing posture in operation 808 (NO at 808), the photographing apparatus disables the barrel driving mode in operation 820 and returns to operation 802.

Otherwise, when the photographing apparatus is at a photographing posture in operation 808 (YES at 808), the photographing apparatus protrudes the barrel 180 in operation 810 and prepares photographing in operation 812.

The photographing apparatus performs photographing to capture an image in operation 814 and performs recording and storing of the captured image in operation 816.

In operation 818, the photographing apparatus transmits the captured image to a called party.

In the embodiment described with reference to FIG. 8, when the user intends to transmit a captured picture during a call by using the photographing apparatus, even when the barrel driving mode is disabled due to a call mode, since the user intends to photograph in the case of a photographing posture, that is, in the case of holding the camera horizontally or vertically, the disablement of the barrel 180 is released (that is, the barrel 180 is protruded) to perform photographing.

As described above, according to the one or more of the above embodiments, the barrel 180 may be prevented from protruding in an undesired situation of the user, and the barrel 180 may be driven based on an indication of a user's intention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of the terms "a," "an," and "the" and similar referents in the context of the specification (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the specification as if it were individually recited herein. Also, the operations of the method described herein may be performed in any suitable order unless otherwise indicated herein or otherwise clearly contradicted by the context. The scope of the inventive concept is not limited to the above-described operation order. All examples or exemplary terms (e.g., "such as") provided herein is merely used to describe the embodiments in detail, and the scope of the inventive concept is not limited by the examples or exemplary terms unless otherwise claimed. Also, those of ordinary skill in the art will readily understand that various modifications and combinations may be made according to design conditions and factors without departing from the spirit and scope of the inventive concept as defined by the following claims.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A method of controlling a photographing apparatus having a voice call function, the method comprising:
   determining whether the voice call function is being performed upon an input of a shutter release signal of the photographing apparatus;
   sensing a distance between the photographing apparatus and an object when the voice call function is being performed upon the input of the shutter release signal; and
   disabling a barrel driving mode based on the shutter release signal when the sensed distance is equal to or less than a predetermined value.

2. The method of claim 1, further comprising determining posture information of the photographing apparatus,
   wherein the barrel driving mode is controlled based on the determined posture information.

3. The method of claim 2, wherein the determined posture information comprises information for determining whether the voice call function of the photographing apparatus or a photographing function of the photographing apparatus is being performed.

4. The method of claim 3, wherein the disabling of the barrel driving mode is maintained when the determined posture information is information indicating that the voice call function is being performed.

5. The method of claim 3, wherein the disabling of the barrel driving mode is released when the determined posture information is information indicating that the photographing function is being performed.

6. The method of claim 1, further comprising recognizing a voice of a user of the photographing apparatus,
   wherein the barrel driving mode is controlled based on recognized voice information for the voice of the user.

7. The method of claim 6, wherein the recognized voice information comprises information for performing a photographing function of the photographing apparatus.

8. The method of claim 7, wherein the disabling of the barrel driving mode is released when the recognized voice information is the information for performing the photographing function.

9. The method of claim 1, wherein the voice call function is determined as being performed when a hands-free connection signal is received.

10. The method of claim 1, further comprising setting a barrel protection mode.

11. A non-transitory storage medium that stores a program, which, when executed by a computer, performs the method of claim 1.

12. A photographing apparatus having a voice call function, the photographing apparatus comprising:
   a voice call detecting unit that determines whether the voice call function is being performed upon an input of a shutter release signal of the photographing apparatus;
   a distance determining unit that senses a distance between the photographing apparatus and an object when the voice call function is being performed upon the input of the shutter release signal; and
   a barrel driving control unit that disables a barrel driving mode based on the shutter release signal when the sensed distance is equal to or less than a predetermined value.

13. The apparatus of claim 12, further comprising a posture determining unit that determines posture information of the photographing apparatus,
   wherein the barrel driving control unit controls the barrel driving mode based on the determined posture information.

14. The apparatus of claim 13, wherein the determined posture information comprises information for determining whether the voice call function of the photographing apparatus or a photographing function of the photographing apparatus is being performed.

15. The apparatus of claim 13, wherein the posture determining unit receives posture information of the photographing apparatus from at least one of a gyro sensor, an acceleration sensor, a tilt sensor, or a rotation sensor that are provided in the photographing apparatus.

16. The apparatus of claim 12, further comprising a voice recognizing unit that recognizes a voice of a user of the photographing apparatus,
   wherein the barrel driving control unit controls the barrel driving mode based on recognized voice information for the voice of the user.

17. The apparatus of claim 16, wherein the recognized voice information comprises information for performing a photographing function of the photographing apparatus.

18. The apparatus of claim 17, wherein the barrel driving control unit releases the disabling of the barrel driving mode when the recognized voice information is the information for performing the photographing function.

19. The apparatus of claim 12, wherein the distance determining unit receives distance information through a proximity sensor provided in the photographing apparatus.

20. The apparatus of claim 12, further comprising a control unit that sets a barrel protection mode.

* * * * *